United States Patent Office 3,527,792
Patented Sept. 8, 1970

3,527,792
PROCESS FOR PREPARING DICYCLOMINE HYDROCHLORIDE
Frank Frederick Ebetino, Norwich, N.Y., assignor to The Norwich Pharmacal Company, a corporation of Delaware
No Drawing. Filed May 9, 1967, Ser. No. 637,078
Int. Cl. C07c 69/74
U.S. Cl. 260—468      1 Claim

ABSTRACT OF THE DISCLOSURE

A new, alternative, higher yielding, simplified process for the preparation of dicyclomine hydrochloride.

---

This invention relates to a chemical process. In particular it is concerned with the preparation of dicyclomine hydrochloride of the formula:

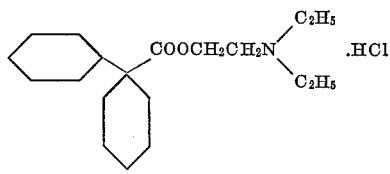

In the past dicyclomine hydrochloride has been prepared from 1-cyclohexylcyclohexyl cyanide by alcoholysis and esterification. This method, while adequate to secure this compound, is not wholly satisfactory especially with respect to yield and manipulative steps.

It is an object of this invention to provide an alternative synthesis of dicyclomine hydrochloride. It is a further object of this invention to provide a means for securing dicyclomine hydrochloride in good overall yield. It is a still further object of this invention to provide a process for making dicyclomine hydrochloride which is readily carried out.

In accordance with the objects of this invention ethyl phenylacetate and a 1,5-dihalopentane such as 1,5-dibromopentane are caused to react in the presence of an alkali hydride such as sodium hydride and solvents inert to the reactants such as dimethylformamide and benzene whereby ethyl 1-phenylcyclohexane carboxylate hydrochloride is secured which, upon ester exchange with 2-diethylaminoethanol in the presence of a catalyst such as sodium in a reaction inert solvent such as xylene, is converted to 2-diethylaminoethyl 1-phenylcyclohexane carboxylate hydrochloride which, upon reduction in the presence of a catalyst such as 5% rhodium on alumina in glacial acetic acid, yields dicyclomine hydrochloride.

In order that this invention may be readily available to and understood by those skilled in the art, the following illustrative example is supplied:

A solution of ethyl phenylacetate (328 g.) and 1,5-dibromopentane (460 g.) in 1820 ml. of 75% dimethylformamide and benzene is added to a suspension of sodium hydride (193 g.) in the same volume of solvent at 55–60°. The mixture is then cooled and water added. The aqueous solution is extracted with ethyl acetate which is then distilled off under vacuum. The resulting residue is vacuum distilled to yield ethyl 1-phenylcyclohexanecarboxylate (169 g.) which when redistilled gives 152 g. (32.7% yield).

A solution of ethyl 1-phenylcyclohexanecarboxylate (152 g.), 2-diethylaminoethanol (164 g.) and sodium (4.2 g.) in 800 ml. of xylene is distilled through a Vigreaux column so as to collect 80% of the theoretical amount of ethyl alcohol. The residue remaining after removal of all volatiles under vacuum gives a solid when treated with ethanolic hydrogen chloride. This, when recrystallized from 2-butanone, yields 37.9% of 2-diethylaminoethyl 1-phenylcyclohexanecarboxylate hydrochloride (84 g.).

Hydrogenation of 2-diethylaminoethyl 1-phenylcyclohexane carboxylate hydrochloride (84 g.) is carried out in a low pressure Parr apparatus using 8.4 g. of 5% rhodium on alumina as the catalyst in 670 ml. of glacial acetic acid. The resulting dicyclomine hydrochloride is obtained in 83.3% yield (71 g.); M.P. 171–172°.

What is claimed is:
1. A process for preparing dicyclomine hydrochloride which comprises; (a) reacting ethyl phenylacetate and a 1,5-dihalopentane (b) effecting ester exchange of the product of (a) with 2-diethylaminoethanol and (c) hydrogenation of the product of (b).

References Cited

The Merck Index, seventh edition.

LORRAINE A. WEINBERGER, Primary Examiner
P. J. KILLOS, Assistant Examiner

U.S. Cl. X.R.
260—469, 999